Patented June 10, 1947

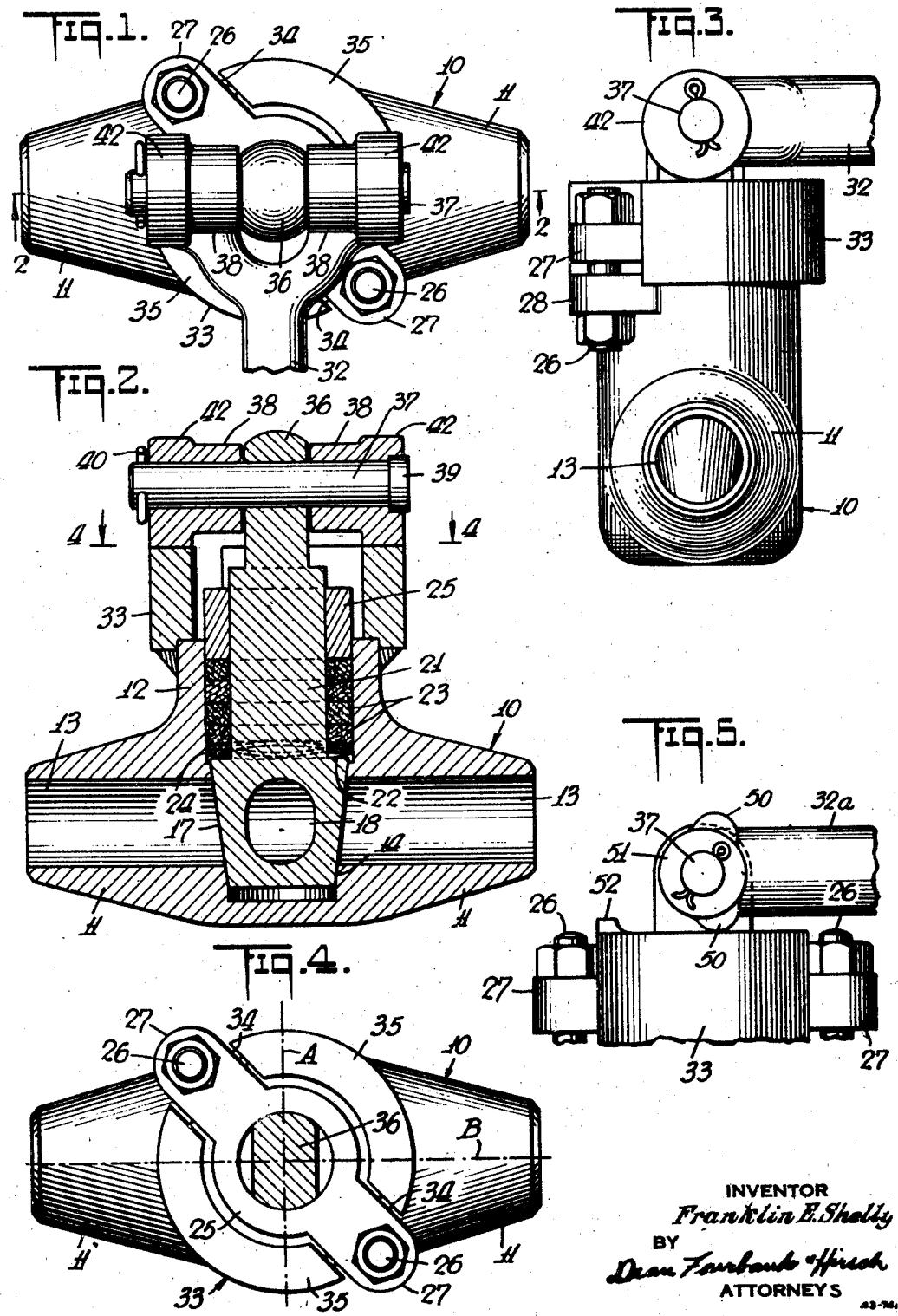

2,421,969

UNITED STATES PATENT OFFICE 2,421,969

PLUG VALVE

Franklin E. Shelly, Louisville, Ky., assignor to Tube Turns, Louisville, Ky., a corporation of Kentucky Application April 23, 1943, Serial No. 484,160

2 Claims. (Cl. 251—97)

The present invention relates to improvements in valves of the turning plug type.

The ordinary tapered valve plug mounted in a correspondingly tapered seat very often sticks fast to its seat due to corrosion, lodgement of sediment or for other reasons, so that a great deal of force is necessary to turn the plug. Various expedients have been suggested to overcome this seizing of the valve plug.

This invention relates more particularly to that type of construction in which the operating handle of the valve plug is so constructed that it may serve not only to turn the plug, but also to force the plug axially so as to break it loose from the seat.

Among the objects of the present invention are to provide a valve of the plug type having a new and improved plug sealing, releasing and rotating means which is simple in construction, inexpensive to manufacture and easy to operate. As one important feature, there is provided an improved construction of a stuffing box which is easily accessible for adjustment, repair or replacement without interference from said plug operating device, and which is effective even during plug releasing operations to maintain a fluid-tight joint. As a further feature, there is provided a resilient packing means which serves not only to form a fluid-tight seal, but also to yieldingly hold the valve in its seat.

Various other objects, features and advantages of the invention will be apparent from the following particular description, and from an inspection of the accompanying drawings, in which Fig. 1 is a fragmentary top plan view of one form of plug valve embodying the present invention;

Fig. 2 is a section taken on line 2—2 of Fig. 1.

Fig. 3 is a side elevation.

Fig. 4 is a section taken on line 4—4 of Fig. 2; and

Fig. 5 is a fragmentary side elevation of another embodiment of certain features of the present invention.

Referring to Figs. 1-4 of the drawings, the valve has a casing or body 10 desirably of forged steel and T-shaped to provide aligned tubular extensions 11, and a tubular neck 12 between said extensions. The tubular extensions 11 define inlet and outlet flow passages 13 respectively, and are suitably shaped for connection to pipes, as for example by welding. Between these flow passages 13 is a chamber, the walls of which form a tapering valve seat 14 receiving a rotary tapered valve plug 17 having a port 18 which may be moved into and out of registry with said passages by rotation of the plug, to control flow through the valve. Integral with or otherwise rigid with one end of the plug 17 is a cylindrical valve stem 21 of reduced diameter to define with the plug 17 an axially facing shoulder 22 at the larger end of the plug. This valve stem 21 extends through the neck 12 of the casing 10 and is engaged by a stuffing box providing a fluid-tight seal between said stem and said neck. For that purpose, the valve stem 21 is smaller in diameter than the bore of the neck 12 to form an annular space for the reception of resilient packing means. This is shown as a series of packing rings 23 which may be of resilient material, and which are desirably of the so-called metallic type having the characteristics of being sufficiently hard to give desired sealing action and also having considerable resiliency. As a part of the resilient packing means, there is shown a pair of spring washers 24. These may be at either end of the packing rings 23 or intermediate of the series. They are shown between the rings and the shoulder 22. This resilient packing is held in place by a gland 25 slidable in the neck 12 and secured by a pair of bolts 26 passing through diametrically opposite pairs of lugs 27 and 28 integral or otherwise rigid with said gland and the casing 10 respectively. The resilient packing means may be put under the desired compression to yieldingly hold the plug to the seat by the tightening of these bolts.

For rotating the plug to open or close the valve, the plug is provided with a handle 32 which may also be operated to break the plug loose from its seat by moving the plug endwise. This may be done preliminary to the turning of the plug or at any other time desired. As shown, the lever is pivotally secured to the upper end of the valve stem 21 and has operative engagement with a fixed tubular cam table 33 concentrically encircling the gland 25 and the stem 21. The cam table 33 is rigid with the neck 12 of the valve casing 10, and may be integral therewith, welded thereto or secured in other suitable means. It extends axially beyond the gland 25, and is provided with a pair of diametrically opposed slots 34 extending transversely of the table 33 to receive the radial gland lugs 27 and permit them to freely slide during adjustment. These gland lugs 27 extend outwardly beyond the outer periphery of the cam table 33, so that the bolts 26 are readily and conveniently accessible for gland adjustment.

The cam table 33 may have a continuous cylindrical lower section and slots in the upper section to receive the gland lugs 27, or it may be slotted all of the way so that it is composed of two separate segments 35 circumferentially spaced to define the two slots 34.

For pivotally receiving the plug operating lever 32, the outer end of the valve stem 21 has its opposite sides flattened to form a shank 36 of reduced width which is apertured to receive a pivot pin 37. The lever 32 is formed at one end with a clevis having branches 38 flanking the flat sides of the stem shank 36 and apertured to receive the pivot pin 37. This pin is retained in the lever clevis against axial movement by any suitable means, as for example a head 39 at one end and a cotter pin 40 at the other end.

Each of the lever branches 38 is formed with or has otherwise rigid therewith a cam 42 engaging the cam table 33. In the form shown in Figs. 1 to 4, the cams 42 are of cylindrical shape eccentrically arranged with respect to the pivot pin 37, so that as the lever 32 is rotated, the eccentrics 42 bearing against the cam table 33 force the plug 17 away from its seat 14. This lifting power applied uniformly at opposite sides of the plug 17 will cause said plug to be raised from its seat 14 in the line of its longitudinal axis without any lateral binding of the plug on its seat.

The eccentricity of the cams 42 is desirably so arranged that when the lever 32 is at right angles to the longitudinal axis of the valve plug 17 as shown in Fig. 3, neither the highest nor lowest parts of said cams are in contact with the cam table 33. The eccentricity of these cams 42 are desirably arranged so that the maximum throw section is in the lower left-hand quadrant of the cams as viewed in Fig. 3, while the minimum throw section is in the upper right-hand quadrant, and the diametrical line of maximum and minimum cam throw extends substantially at an angle of 45° with the plane of the cam table. With this arrangement, as the lever 32 is raised from the position shown in Fig. 3, the throw of the eccentrics 42 progressively increases until said lever has been raised about 45°. During this rotation of the lever 32, the camming action described exerts a lifting force on the plug 17 against the spring action of the resilient packing means on the valve stem, thereby loosening said plug from its seat. After this preliminary plug releasing operation, the lever 32 while in inclined plug releasing position or after return to the position shown, can be rotated about the axis of the plug 17 to rotate said plug and open the valve. During this rotary movement of the plug 17, the two eccentric cams 42 ride on respective segments 35 of the cam table 33.

The maximum turn of the plug 17 between fully opened and fully closed position is approximately 90°, so that the cams 42 during this rotary plug movement ride along 90° sections of the two segments of the cam table 33. The two slots 34 extend substantially at 45° with the axial plane A as viewed in Fig. 4, so that the two rectangular axial planes A and B are symmetrically or centrally arranged with respect to the two cam table segments 35. With this arrangement, the cams 42 will ride on said segments 35 between limiting planes A and B and along the central parts of these segments.

When the lever 32 is returned to a plane parallel to the cam table, the resilient packing means will reseat the valve plug 17. However, this return of the plug 17 into seated position will not refreeze the plug, since any corrosion or foreign matter which had previously seized the plug in its seat is broken. Therefore, once the plug 17 is loosened from its seat, it may be readily turned even without lifting the handle 32.

The releasing of the plug 17 from its seat is not attended by loss of sealing efficiency of the stuffing box. As a matter of fact, the releasing movement of the plug 17 increases the compression of the packing 23, and therefore renders sealing by the stuffing box more effective during this operation.

The eccentricity of the cams 42 is so arranged with respect to the pivot pin 37 that the lever 32 will operate equally whether it extends horizontally to the right as shown in Fig. 3 or to the left. From either position, the plug 17 can be released by an angular movement of the handle to a maximum limiting position of approximately 45°.

In the form of the invention shown in Fig. 5, each of the cams instead of being in the form of an eccentric, consists of two projections 50 extending from a cylindrical hub 51 forming part of each branch of the lever clevis. These cam projections 50 extend at an angle with respect to the vertical axial plane as shown in Fig. 5, so that the releasing movement of the valve plug away from its seat is effected not by an outward angular movement of the handle 32a, as in the construction of Figs. 1-4, but by a depressing movement towards the valve casing. The two cam projections 50 on each side of the lever clevis are arranged so that in either right-hand or left-hand position of the lever 32a shown in Fig. 5, the valve plug can be moved from its seat by a similar depressing movement of said lever.

In order to prevent the lever 32a from being turned beyond limiting positions, each of the segments of the cam gland 33 is provided with a stop 52 in position to engage the cam projections 50 in limiting positions of the plug.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A valve comprising a casing having a tapering valve seat and presenting a cam table having spaced sections, a rotary tapered valve plug in said seat, a stem rigid with said plug and defining therewith an axially facing shoulder, a packing around said stem, a gland encircling said stem for pressing said packing against said shoulder, said gland having a pair of opposed lugs extending outwardly between the sections of said cam table, means engaging said lugs for adjusting said gland, and a lever pivotally connected to said stem beyond said gland, and having a pair of spaced cams rigid therewith and engaging with and movable along said cam table as said valve plug is rotated.

2. A valve comprising a casing having a tapering valve seat, a tapering valve plug adapted to fit said seat, a stem rigid with said plug and defining therewith an axially facing shoulder on said plug, a stuffing box for maintaining a fluid-tight joint around said stem and including a packing around said stem, a gland around said stem and bearing against said packing to press said packing between said shoulder and said gland, and means adjustably securing said gland to said casing, a transversely extending pivot pin on the outer end of said stem, a lever pivoted on said pin beyond said stuffing box and having a pair of cams, a tubular cam table encircling said stem and engaging said cams, said table being rigid with said casing and having an opening in the wall thereof, and means in said opening for adjusting said gland.

FRANKLIN E. SHELLY.

REFERENCES CITED

The following references are of record in the file of this patent:

UNITED STATES PATENTS

| Number | Name | Date |
|---|---|---|
| 2,142,795 | McFarlane | Jan. 3, 1939 |
| 2,237,020 | Wilson | Apr. 1, 1941 |
| 1,128,846 | Carroll | Feb. 16, 1915 |
| 2,226,169 | Koehler | Dec. 24, 1940 |

FOREIGN PATENTS

| Number | Country | Date |
|---|---|---|
| 352,228 | Great Britain | July 9, 1931 |
| 442,860 | France | June 29, 1912 |